Oct. 17, 1961  H. F. BRINEN  3,004,626
DEAERATING RADIATOR
Filed May 14, 1958  2 Sheets-Sheet 1
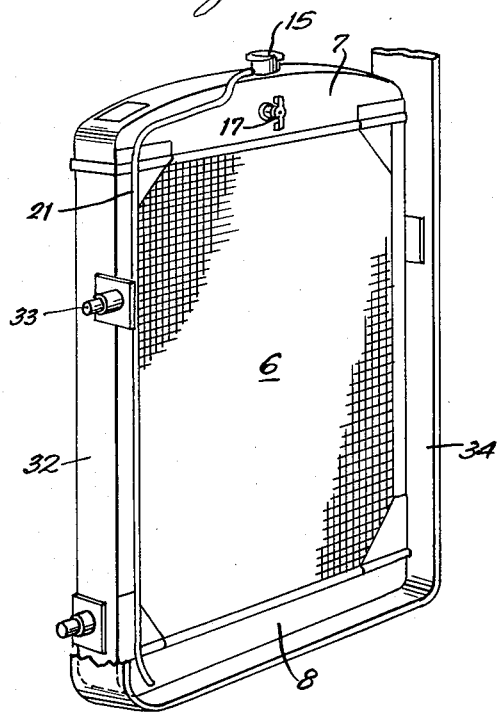
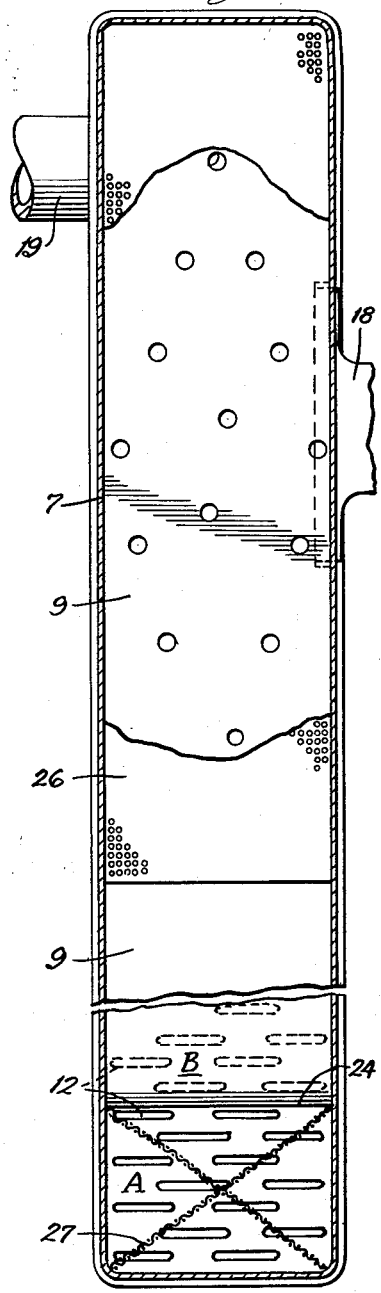
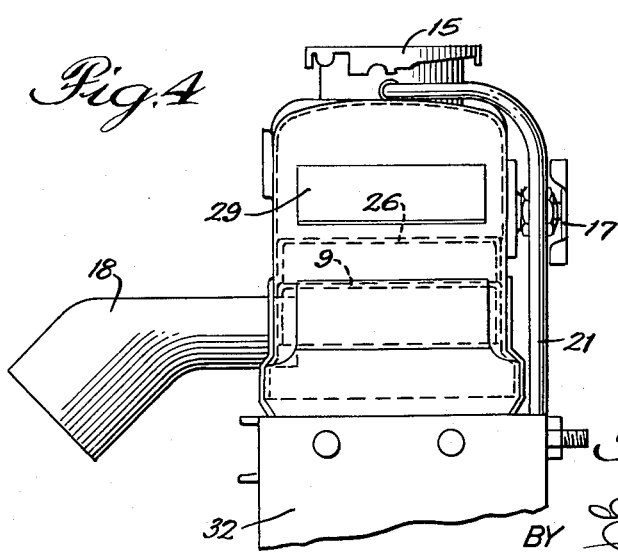
INVENTOR:
Howard F. Brinen,
BY
ATTORNEY.

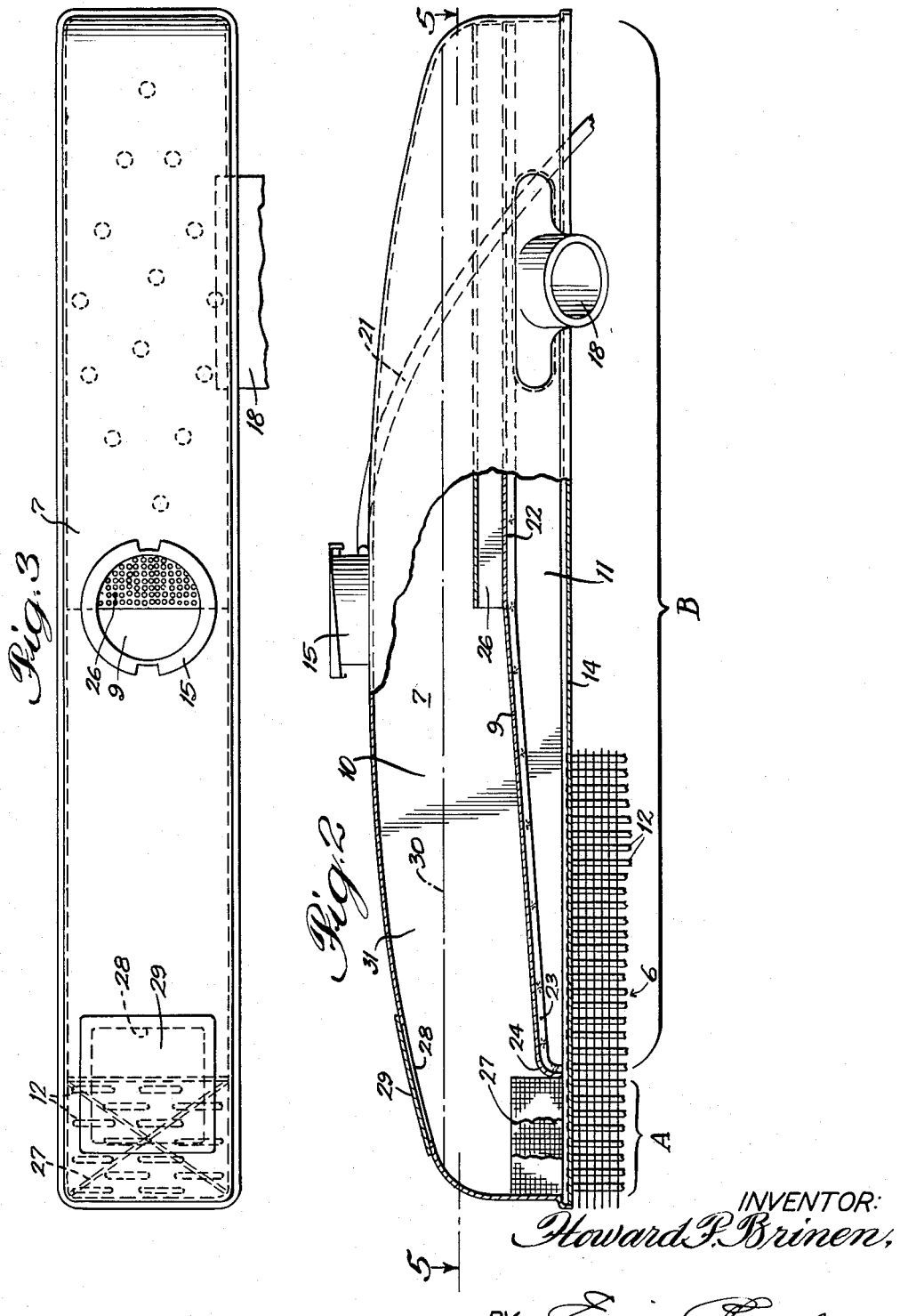

United States Patent Office 3,004,626
Patented Oct. 17, 1961

3,004,626
DEAERATING RADIATOR
Howard F. Brinen, Racine, Wis., assignor to Young Radiator Company, Racine, Wis., a corporation of Wisconsin
Filed May 14, 1958, Ser. No. 735,169
10 Claims. (Cl. 183—2.5)

This invention relates to radiators for use in the cooling of water for heat-generating engines and particularly those used on large-size, heavy-duty automotive equipment.

Of recent years there has been a constant step-up of the horse power of engines, especially of the type used for automotive equipment. Such increased horse power has been achieved in various ways. Some engine manufacturers have attained this merely by enlarging the cylinder bores in a conventional cylinder block. This very likely may cause an increase in the heat load on the water-jacket cooling system. Increasing the cylinder bores obviously results in reducing the volume of the water jacket around the cylinders.

Other manufacturers have designed their engines for larger capacity and provided them with larger pumps than used with their previously lower horse power units. The high-compression V-8 engines are far more efficient than the older six cylinder in-line engines. However, these new larger engines require smaller radiators than their predecessor engines with the smaller output. The smaller radiator with the smaller tanks present potential aeration problems. If the pump were larger, even though the cooling load were smaller with the V–8 engine, potential aeration problems are presented.

Automotive equipment, of the aforesaid type, generally is structured to provide a limited amount of space for the engine and its requisite radiator. In some types of such equipment, the space for the engine and radiator is severely limited, as in the case where the operator's cab is set very close to the front of the chassis or, at times, directly over the engine and integrated with the engine hood.

These current increases in horse power for automotive equipment has confronted the manufacturers of heat-exchange equipment with the demand for radiators operable with acceptable efficiency at water flow rates predetermined by the pump supplied by the engine manufacturer. Very often these demands are greatly in excess of past requirements for radiators.

Accelerated velocity of the water flow through the top tank of a radiator intensifies turbulence with a consequent increase in the aeration of the water. Also, in the diesel-type engine, there may be an aeration of the cooling water as a result of leakage of exhaust gases from the cylinders. An aerated water condition in an engine cooling system, whatever the cause, reduces the heat transfer rate.

Hence, the problem currently confronting heat exchanger manufacturers is the construction of radiators conformable to predetermined dimensions, for use with higher water-flow rates demanded for engines of increased horse power, and capable of preventing aeration of the cooling water.

Various expediences, heretofore resorted to in an attempt to solve this problem, have not given or held promise of giving satisfactory results.

The main objects of this invention, therefore, are to provide an improved form of radiator construction for use in engine-jacket water-cooling systems for heat-generating engines; to provide an improved radiator of this kind which effects a practically complete deaeration of the water flow at velocities not only currently demanded but threatened for the future; to provide an improved radiator structure especially adapted for use in the present conventional types of automotive equipment hereinbefore referred to; to provide an improved radiator of the aforesaid type with a top tank having intercommunicating chambers separately connected with sections of the core, one of which chambers cushions and effects deaeration of the water flow in the cooling system; to provide an improved sectionalized core and chambered tank of this kind to insure the maximum cooling of the entire water flow through the cooling system; to provide an improved chambered top tank and sectionalized core of this kind which will insure effective cooling and deaeration of the water flow at flow rates materially in excess of those currently demanded as well as later contemplated by manufacturers of automotive equipment of the type hereinbefore set forth; and to provide an improved deaerating radiator construction of this kind which is of so simple construction as to make its manufacture as economical as and its use more efficient than radiators currently available for similar use.

In the adaptation shown in the accompanying drawings:

FIG. 1 is a front, perspective view of a radiator constructed in accordance with this invention;

FIG. 2 is an enlarged front elevation of the upper portion of the radiator shown in FIG. 1 parts being broken away to more clearly show the internal construction;

FIG. 3 is a top plan view of the same;

FIG. 4 is a slightly enlarged side elevation of the upper portion of the radiator taken from the right-hand end of FIG. 2; and FIG. 5 is a longitudinal, sectional view taken on the plane of the line 5—5 of FIG. 2, a large portion of a perforate baffle being broken away to more clearly show the underlying apertured partition.

The essential concept of this invention involves a radiator wherein the top tank is longitudinally-partitioned to form an upper compression and deaerating chamber communicating with a limited group of tubes of the core and a coolant-inlet chamber communicating with the remainder of the tubes of the core, the two chambers having limited communication through apertured and perforate sections of the tank divider, whereby the coolant flow is effectively freed of air pockets.

A radiator embodying the foregoing concept comprises a core 6 and top and bottom tanks 7 and 8 the top one of which is divided by a partition 9 into upper and lower chambers 10 and 11. The upper chamber 10 communicates with a limited group A of tubes 12 and the core 6 whereas the lower chamber 11 communicates with a group B of all of the remainder of the tubes of the core 6. The two chambers have limited intercommunication through a predeterminedly-distributed series of apertures 13 in the partition.

The core 6 is of conventional construction, involving a battery of flat oval tubes 12 arranged parallel in transverse rows of two or more tubes. The tubes 12 are bonded to and supported by the vertically-spaced top and bottom header plates, only the former 14 of which is indicated in FIG. 2.

The tanks 7 and 8 also are of a conventional construction which have flared perimeters fitting inside and bonded to the flanged perimeters of the top and bottom header plates, in a well known manner. The top tank 7 is provided with a conventional filler neck 15. As here shown the filler neck is located centrally on the crown of the tank 7. However, where circumstances make it desirable or necessary, a suitable filler neck 15 could be located on either the front or rear face of the top tank 7. A cap (not shown), for the filler neck 15, mounts a conventional combination pressure and vacuum relief valve which allows for the escape of an excessive pressure in the radiator and for the entrance of air into the radiator to dissipate a vacuum if one should result from excessive condensation of steam.

Generally, the top tank 7 would be equipped with a try-cock 17 mainly for the purpose of indicating when the desired water level 21, in the tank 7, is attained. Incidently such a try-cock also permits an escape of air at the time of initial or later filling of the radiator with water. Here the try-cock 17 is shown on the front middle face of the tank 7. Under certain circumstances it might be placed at another point.

A suitable type of conventional coolant inlet connection 18 is mounted on the top tank 7 to communicate directly with the chamber 11. Such an inlet connection may be located at almost any point along the length of the top tank 7 as may prove to be most practical under the conditions confronted. A coolant outlet connection 19 is secured at a suitable point to the bottom tank (see FIG. 3). These inlet and outlet connections 18 and 19, obviously, would be respectively connected to conduits leading to the engine jacket and from the circulating pump, of the usual engine-jacket cooling system.

A convention over-flow tube 21 leads from the filler neck 15 along one side of the core to a point below the bottom tank to vent off and take in air as well as let off excessive water.

The partition 9, which is the primary distinctive feature of this invention, as here shown, is of channel shape and in transverse width substantially the same as the interior width of the tank 7. In length, the partition 9 is a bit less than the interior length of the tank 7. The flanged partition 9 is positioned in the tank 7 with the flanges 22 bonded to the sides of the tank to dispose the partition intermediate the header plate 14 and the parallel longitudinal tank median of the tank 7. The partition 9 extends from one end of the tank 7 to a point short of the opposite end.

As is most clear from FIG. 2, a portion of the partition 9, at one side of the transverse median plane of the tank 7, is substantially parallel to the opposed header plate 14. The portion of the partition to the other side of the transverse tank median is gradually inclined toward the header plate 14 and terminates in a transverse flange 23 inwardly adjacent the end of the tank 7. The flanged end 23 of the partition 9 is here shown positioned between the third and fourth transverse rows of core tubes 12, at which point the flange 23 is bonded to the header plate 14. Thus, the upper chamber 10 communicates with the group A of tubes 12 whereas the chamber 11 communicates with all the remaining group B of the core tubes 12. The proportion of tubes 12 which communicate with their respective tank chambers 10 and 11 is not a definitely determined ratio. There well could be situations or conditions where that would have to be determined by experiment. Various experiments were necessary to arrive at what here is shown as a possible optimum division. This provides for approximately seven percent of the core tubes communicating with the upper chamber 10 and the remainder of the tubes communicating with the chamber 11. This is regarded as causing about 7 percent of the water in the radiator to pass through the group A tubes.

The inclined portion of the partition 9 and the rounded approach 24 to the transverse flange 23 and leading to the group A tubes 12 (FIG. 2) tend to so effect a flow of coolant toward the group A outlet tubes 12 as to reduce to the very minimum, if not actually eliminate, the creation of turbulence in the flow of the coolant entering this group A of the tubes 12.

Intercommunication between the top tank chambers 10 and 11, as FIG. 3 shows, is afforded through a series of partition apertures 25. These are shown arranged in a predetermined pattern simulating an elongated diamond and disposed throughout the length and width of that portion of the partition 9 which is parallel to the header plate 14. It should not be assumed that such a pattern is critical to this invention. Neither should it be assumed that the number of apertures is critical. The number and positioning of the apertures 25 often may have to be determined by experiment. The factor that is important to this invention is the provision of a series of apertures 25 to afford a limited intercommunication between the chambers 10 and 11, preferably somewhat near the inlet connection 18.

Superimposed closely above the apertured portion of the partition 9, and forming a part of the tank divider, is a perforate snubber baffle 26. As is most clear from FIG. 4, this baffle 26, like the partition 9, is channel shape and equal in width to that of the interior of the tank 7. It extends from a point adjacent the transverse tank median to the end of the tank opposite that where the upper chamber 10 connects with the group A of core tubes 12. The top face of this channel-shaped baffle 26 is completely and closely perforated (see FIGS. 2 and 3). The function of this perforate baffle will be explained presently.

In the area above the group A of tubes 12, with which the chamber 10 communicates, is placed a vertically-disposed X-shaped screen 27, made of fairly fine woven wire. The purpose of this screen 27 is to prevent the formation of a vortex at the entrance to the tubes 12, as is so characteristic of liquids flowing to and through vertical outlets.

In order to permit bonding the flanges 23 to the header plate 14, it has been found expedient to provide a handhole 28 in the top of the tank 7 over the group A tubes 12 with which the chamber 10 communicates (see FIGS. 2 and 3). This permits the necessary tools and solder or brazing compounds to be introduced into the tank 7 to effect the bonding of the flange 23 to the header plate 14. Such bonding being effected, a plate 29 is bonded over the hole 28.

The core section 6 has bonded to the sides thereof channel-shaped plates 32 on which are fixed trunnions 33. There are various ways in which such a radiator may be supported on the chassis of the automotive equipment wherewith it is to be used. FIG. 1 shows a portion of an inverted, U-shaped bracket 34 the bottom transverse part of which is fixed to the chassis. The trunnions 33 are seated on the bracket 34. The upright arms of the bracket have a sufficient freedom of movement to avoid transmitting vibrations of the chassis to the radiator to its possible damage.

The manner in which this structure is designed to and does function is substantially as follows:

The cap (not shown) being removed from the filler neck 15, a coolant—generally water—is introduced into the radiator through such filler neck 15. The try-cock 17 is opened to determined the water level in the top tank 7. The radiator is filled with water to a water line 30 (FIG. 2), approximately midway between the partition 9 and the crown of the tank 7. The object in filling water to this level is to have the remaining air space above the water line 30 serve as a deaerating and compression cavity 31 of the chamber 10. The volume of the cavity should be between seven and ten percent of the total water-space in the radiator, i.e. the core tubes and the two tanks 7 and 8. Water emitting from the try-cock 17 would indicate that the desired water level 30 has been reached.

Since there is always a certain amount of air in the entering water and more may be entrapped in the system during the filling, it may be necessary, after a brief run of the engine, to add a further quantity of water to attain the desired water level, as indicated at 30 in FIG. 2.

As is well known, with cooling systems of this kind for use with which this type of radiator is designed, the circulating pump (not here shown) draws water from the outlet port 19 on the bottom tank 8 and forces the water through and around the engine jacket and back into the radiator inlet 18 in the top tank 7. The water entering the chamber 11 is under pressure of the cap setting plus about 4 p.s.i., (i.e. 7+4=11 p.s.i.) during the normal operation of the automotive equipment with which such a radiator is used. Obviously, such pressure will cause the main flow to be from the chamber 11 down through the major group B of the core tubes 12. However, at the same time jets of water will issure up through the apertures 25, in the partition 9, into the upper tank chamber 10. These jets are rather evenly distributed throughout the length and breadth of more than half of the partition 9.

It is important to note, at this point, that these jets emerge into a body of water between the partition 9 and the water line 30, above which is an air cavity 31 (FIG. 2). These water jets inevitably carry a certain quantity of air and, perhaps, some exhaust gases. As these air jets enter the water above the partition 9, the pressure, which caused their emergence through the apertures 25, is suddenly checked by the water body overlaying the partition. The water jets being relatively small results in no material disturbance of the body of water, above the partition 9, except at excessive high flow ratio. Consequently, the jets quickly and quietly mix with the water above the partition 9. Any entrained air or gas emerges to the surface of the water line 30 and is free to mix with the air in the pressure air cavity 31 of the chamber 10. Obviously, such escaping air maintains or adds to the air pressure normally intended to exist above the water line.

The perforate snubber baffle 26 functions to further insure against the jets, issuing through the partition apertures 25, from agitating the body of water above the partition 9. If there is enough pressure of the water in the chamber 11 to cause the water jets to enter the body of water above the partition 9 with such force as to impinge against the baffle 26, the jets are fractured by the baffle perforations, thus effecting a further release of any entrained air. This action of the baffle 26 eliminates any remaining tendency of these emerging water jets to agitate the body of water above the partition 9 and cause a mixture of air and water in the tank chamber 10.

Thus the objective of the superimposed perforate snubber baffle 26, and the supporting apertured partition 9 is to permit such a cushioning of the air and/or exhaust gas-laden water entering the chamber 10, as will insure a complete escape of all entrained air into the compression cavity 31 of the chamber 10.

The force of gravity and the suction of the circulating pump will cause a low-velocity flow of water from the tank chamber 10 toward and into the group A of tubes 12, beyond the flange 23. The incline of the partition 9 and the rounded approach 24 of the transverse flange 23 will preclude any nozzle effect developing as the water issues from the chamber 10 into the group A tubes. Therefore, any tendency to create air-and-water mixing agitation at this point is completely absent.

All possibility of a vortex occurring as the flow of water from the chamber 10 enters the group A tubes is precluded by the vertically-disposed X-shaped screen 27. The easily-flowing water having to pass through this screen 27 checks any tendency to even start a centrifugal swirling that otherwise might eventuate into an air-mixing vortex.

Extensive laboratory and automotive equipment tests have demonstrated that such a tank partition 9 and connection of the chambers 10 and 11 to proportionate groups A and B of the radiator tubes will so completely eliminate air and exhaust gases from the water as to preclude any water loss from the radiator even under the most extreme conditions, as when the water is maintained at or close to boiling temperature over an extended period of time.

Variations and modifications in the details of structure and arrangement of the parts may be resorted to within the spirit and coverage of the appended claims.

I claim:
1. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers whereby the upper chamber has communication at one end of the tank confined to a limited number of tubes and the lower chamber has communication confined to all the remainder of the tubes, the chambers having limited communication confined to a predetermined series of apertures in the partition, a perforate snubber baffle superimposed on the apertured portion of the partition, an inlet port in the top tank communicating with the lower chamber, and an outlet port in the bottom tank.

2. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers and terminating adjacently inward of one end of the tank and bonded to the header plate transversely inward of a predetermined number of rows of tubes whereby the upper chamber has communication confined to a limited number of tubes and the lower chamber has communication confined to all the remainder of the tubes, the chambers having limited intercommunication confined to a predetermined series of apertures in the partition, an inlet port in the top tank communicating with the lower chamber, and an outlet port in the bottom tank.

3. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers and terminating adjacently inward of one end of the tank and bonded to the header plate transversely inward of a predetermined number of rows of tubes whereby the upper chamber has communication confined to a limited number of tubes and the lower chamber has communication confined to all the remainder of the tubes, the chambers having limited intercommunication confined to a predetermined series of apertures distributed in that portion of the partition between the opposite end thereof and the transverse tank median plane, an inlet port in the top tank communicating with the lower chamber, and an outlet port in the bottom tank.

4. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers, the partition having the one portion thereof at one side of the transverse tank median plane substantially parallel with the opposed header plate and the other portion at the other side of the tank median plane gradually inclined toward the header plate with the end of the partition bonded to the header plate transversely inwardly of a predetermined number of rows of tubes whereby the upper chamber has communication confined to a limited number of tubes and the lower chamber has communication confined to all the remainder of the tubes, the chambers having limited intercommunication confined to a predetermined series of apertures in the one portion of the partition, an inlet port in the top tank communicating with the lower chamber, and an outlet port in the bottom tank.

5. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers, the partition having the one portion thereof at one side of the transverse tank median plane substantially parallel with the opposed header plate and the other portion at the other side of the tank median plane gradually inclined toward the header plate with the end of the partition bonded to the header plate transversely inwardly of a predetermined number of rows of tubes whereby the upper chamber has communication confined to a limited number of tubes and the lower chamber has communication confined to all the remainder of the tubes, the chambers having limited intercommunication confined to a predetermined series of apertures distributed in the one portion of the partition, a perforate snubber baffle superimposed on the apertured portion of the partition, an inlet port in the top tank communicating with the lower chamber, and an outlet port in the bottom tank.

6. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers, the partition being located between the opposed header plate and the parallel longitudinal median plane of the tank and having the one portion of the partition at one side of the transverse tank median plane substantially parallel with the opposed header plate and the other portion of the partition at the opposite side of the transverse tank median plane gradually inclined toward the header plate with the end of the partition bonded to the header plate inwardly of a predetermined number of rows of tubes whereby the upper chamber has communication confined to a limited number of tubes and the lower chamber has communication confined to the remainder of the tubes, the chambers having limited intercommunication confined to a predetermined series of apertures distributed in that one portion of the partition, an inlet port in the top tank communicating with the lower chamber, and an outlet port in the bottom tank.

7. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers, the partition being located between the opposed header plate and the parallel longitudinal median plane of the tank and having the one portion of the partition at one side of the transverse tank median plane substantially parallel with the opposed header plate and the other portion of the partition at the opposite side of the transverse tank median plane gradually inclined toward the header plate with the end of the partition bonded to the header plate inwardly of a predetermined number of rows of tubes whereby the upper chamber has communication confined to a limited number of tubes and the lower chamber has communication confined to the remainder of the tubes, the chambers having limited intercommunication confined to a predetermined series of apertures distributed in that one portion of the partition, a perforate snubber baffle superimposed above the apertured port of the partition, an inlet port in the top tank communicating with the lower chamber, and an outlet port in the bottom tank.

8. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers and terminating adjacently inward of one end of the tank and bonded to the header plate transversely inward of a predetermined number of rows of tubes whereby the upper chamber has communication confined to a limited number of tubes and the lower chamber has communication confined to all the remainder of the tubes, a screen arranged in the end of the upper chamber directly communicating with the predetermined number of tubes, the chambers having limited intercommunication confined to a predetermined series of apertures in the partition, an inlet port in the top tank communicating with the lower chamber, and an outlet port in the bottom tank.

9. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers and terminating adjacently inward of one end of the tank and bonded to the header plate transversely inward of a predetermined number of rows of tubes whereby the upper chamber has communication confined to a limited number of tubes and the lower chamber has communication confined to all the remainder of the tubes, an X-shaped screen vertically-disposed in the end of the upper chamber directly communicating with the predetermined number of tubes, the chambers having limited intercommunication confined to a predetermined series of apertures in the partition, an inlet port in the top tank communicating with the lower chamber, and an outlet port in the bottom tank.

10. A deaerating radiator comprising, a core having a battery of parallel tubes spanning and supported on top and bottom header plates, a tank secured to each of the header plates, a longitudinally-disposed apertured partition internally bonded to the top tank to divide the interior thereof into upper and lower chambers, the partition being located between opposed header plate and parallel longitudinal median of the tank and having the one portion of the partition at one side of the transverse tank median substantially parallel with the opposed header plate and the other portion of the partition at the opposite side of the transverse tank median plane gradually inclined toward the header plate with the end of the partition bent into transverse relationship and bonded to the header plate transversely inward of a predetermined number of rows of tubes whereby the upper chamber communication is confined to a limited number of tubes and the lower chamber communication is confined to all the remainder of the tubes, the chambers having limited intercommunication confined to a predetermined series of apertures distributed in the one portion of the partition, a perforate snubber baffle superimposed above the apertured portion of the partition, and X-shaped screen vertically disposed in the end of the chamber directly communicating with the predetermined number of tubes, an inlet port in the top tank communicating with the lower chamber, and an outlet port in the bottom tank.

References Cited in the file of this patent
UNITED STATES PATENTS

| | | |
|---|---|---|
| 2,214,658 | Browning | Sept. 10, 1940 |
| 2,628,079 | Haynes et al. | Feb. 10, 1953 |